United States Patent

Hatwar et al.

[11] Patent Number: 6,007,887
[45] Date of Patent: *Dec. 28, 1999

[54] PERFORMANCE RECORDING MEDIA FOR RECORDABLE ELEMENT USING SILVER REFLECTOR

[75] Inventors: Tukaram K. Hatwar, Penfield; Yuan-Sheng Tyan, Webster, both of N.Y.

[73] Assignee: Eastman Kodak Company, Rochester, N.Y.

[ * ] Notice: This patent is subject to a terminal disclaimer.

[21] Appl. No.: 08/991,028

[22] Filed: Dec. 15, 1997

[51] Int. Cl.⁶ .................................................... B32B 3/00
[52] U.S. Cl. ..................... 428/64.1; 428/64.4; 428/64.7; 428/64.8; 428/457; 428/913; 430/270.14; 430/495.1; 430/945; 369/283; 369/288; 427/372.2
[58] Field of Search .................................. 428/64.1, 64.2, 428/64.4, 64.7, 64.8, 65.1, 457, 913; 430/270.14, 270.16, 270.17, 495.1, 945; 369/283, 288; 427/372.2

[56] References Cited

U.S. PATENT DOCUMENTS

| | | |
|---|---|---|
| 4,940,618 | 7/1990 | Hamada et al. . |
| 5,090,009 | 2/1992 | Hamada et al. . |
| 5,294,471 | 3/1994 | Evans et al. . |
| 5,449,587 | 9/1995 | Itoh et al. . |
| 5,492,744 | 2/1996 | Koike et al. ......................... 428/64.1 |
| 5,604,004 | 2/1997 | Suzuki et al. . |

Primary Examiner—Elizabeth Evans
Attorney, Agent, or Firm—Raymond L. Owens

[57] ABSTRACT

An optical disk with improved stability and performance including a transparent substrate; and a recording layer over the substrate and a reflective layer formed of Ag over the recording layer and having its property changed by heat treatment for a time and temperature in a range of about 50°–120° C. so as to significantly improve window margin, reflectivity, jitter, and stability.

13 Claims, 4 Drawing Sheets

PERFORMANCE RECORDING MEDIA FOR RECORDABLE ELEMENT USING SILVER REFLECTOR

CROSS REFERENCE TO RELATED APPLICATIONS

The present invention is related to commonly assigned U.S. patent application Ser. No. 08/991,016, (77054) filed concurrently herewith entitled "Improved Performance Recording Media For Recordable Element Using Gold Reflector" to Hatwar and Tyan. The disclosure of this related application is incorporated herein by reference.

FIELD OF THE INVENTION

The present invention relates to optical recording elements and methods of forming such elements with improved performance.

BACKGROUND OF THE INVENTION

Optical disks are becoming more and more prevalent for the use of recording information. One form of optical recording disks is called a CD-R or a recordable compact disk. The Photo CD is an example of this CD-R media. Typically, this type of disk has a transparent substrate, a recording layer formed on a substrate, and a reflective layer on the recording layer. The recording layer is essentially a photo absorption material made of mixture of some organic dye materials and is formed by spin coating. The recording materials used for CD-R applications have been described in U.S. Pat. Nos. 4,940,618; 5,604,004; 5,294,471; European Patent Application 0353393; and Canadian Patent 2,005,520. Commercial useful materials of the type described in these references have stringent requirements. One of these requirement is light stability. Since the Photo CD is a consumer product, it must be capable of withstanding extreme environment. The stability of the disk mainly depends on the nature of the recording layer and the reflector layer and their mutual interaction; and the protective overcoat. The above applications disclose phthalocyanine dye, metallized formazan dye and cyanine dye having excellent light stability. The reflecting layer is usually selected to be gold or a gold alloy because of its nobleness and high reflectivity. The CD-R specifications require that it has a high reflectivity of more than 60% similar to the compact disks.

During recording, writing laser light passes through the plastic substrate and is focused on the dye recording layer which is heated to the decomposition temperature of the dye material. While the surface of the substrate is also heated to near the glass transition temperature of the substrate material. Then a small part of the dye material is decomposed and decomposition gas is generated in the photo-absorption layer. It causes the deformation of the recording layer as well as the dye/substrate interface. In those areas having the deformations or pits, the reflectivity is lower than in those areas not having the deformation which has passed through the recording layer is reflected back by the reflective layer and further enhances the process of forming the mark. Marks are formed either as a pit or as a change in the optical properties of the recording layer. In any event, the combination of some or all of these changes forms marks which can then be read back by the focused read laser beam. The record thus consists of marks of relatively low reflectivity on a background of relatively high reflectivity in relation to the read beam.

Thin layer of gold is normally used as a main reflection material in the reflective layer. It is a noble metal with a very high stability and does not introduce problems into the recording stability. When other metals which have a high reflectivity such as aluminum, silver and copper are used instead of gold, they have a problem in that they are reactive and can form oxides or other corrosive layers. The recording stability of these types of disks varies over time and degrades. However, materials such as silver are much less expensive than gold, and it would be highly desirable to use them. Also silver reflector has about 5–7% higher reflectivity than gold.

Jitter of a recorded feature is related to its ability of being detected without error during read back. Transitions from nominally identical recorded feature will not be read back precisely at the same time because of the slight variation in feature length and shape and system noise. This gives rise to a spread in detection time. A detection time window can read all these features if the distribution is so narrow as to lie completely within the time window. On the other hand, if the distribution is broad such that some of the transitions occur outside the window, they will result in a decoding error. Jitter is a measure of the overall noise and is the square root of the variance of the distribution of detection time commonly modeled as a Gaussian curve. The distribution of detection time may not be exactly centered in the timing window which will increase the probability of a decoding error even for a narrow distribution. The window margin (WM) is a derived parameter involving jitters and peak shifts of all recorded features. The lower the jitters and peak shifts, the higher is the Wm. The WM can be viewed as a figure of merit in that the discs with higher Wm has a greater probability of successful read back than the one with lower Wm. Also the disc with higher WM is expected to be read back by a wider variety of readers than the one with lower WM that is otherwise similar.

SUMMARY OF THE INVENTION

Therefore it is an object of this invention to provide recording media with markedly improved stability and properties, particularly with respect to WM, jitter, nonlinearity, and reflectivity.

This object is achieved by a recordable element with improved performance, comprising
  a) a transparent substrate; and
  b) a recording layer over the substrate and a reflective layer formed of Ag over the recording layer and having its property changed by heat treatment for a sufficient time and at a temperature in a range of about 50–120° C. so as to significantly improve window margin, reflectivity, jitter, and thermal stability.

ADVANTAGES

The media produced in accordance with the present invention have improved performance in, window margin, jitter, nonlinearity and reflectivity.

The disk prepared according to the present invention has improved data stability.

Silver metal is relatively inexpensive than gold and the disk can be manufactured at a substantially reduced cost.

DETAILED DESCRIPTION OF THE INVENTION

Figure 1:
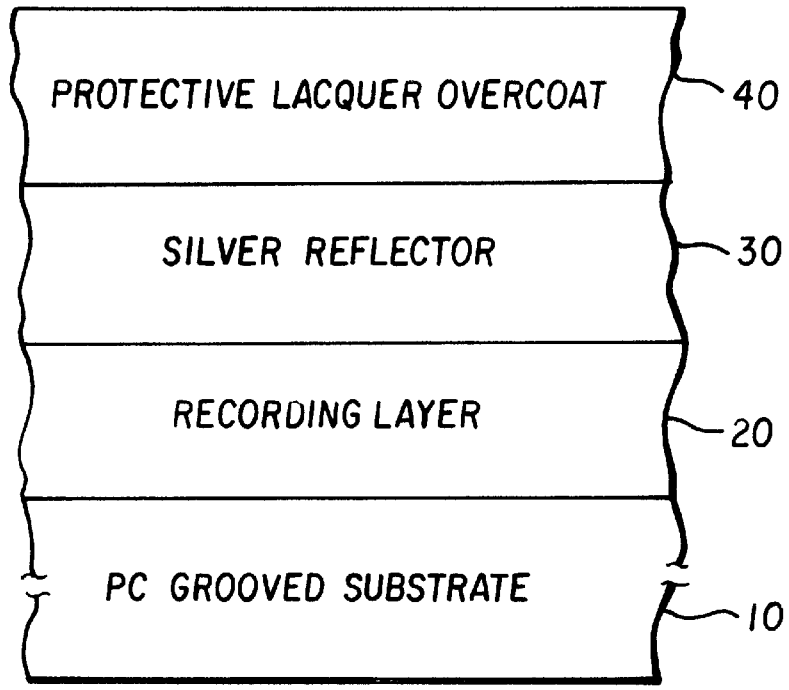
FIG. 1 is a schematic representation, in cross-section, of one element in accordance with the invention.
Figure 2:
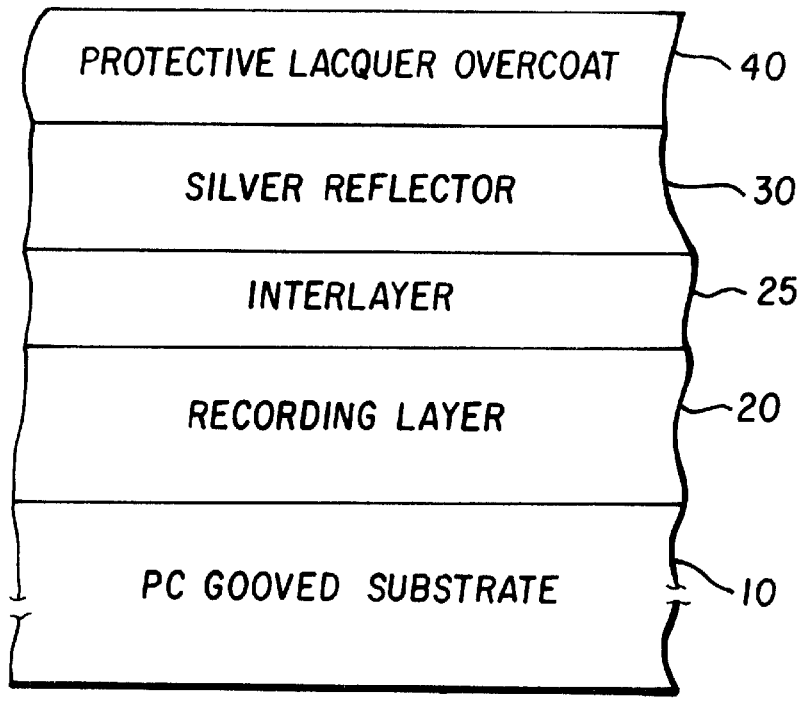
FIG. 2 is a schematic representation, in cross-section, of one element similar to FIG. 1 but with an additional interlayer between the recording layer and the reflector.

FIG. 1 is a structure of a writable storage disk made in accordance with the invention. It includes a substrate 10 which is made of polycarbonate and a dye recording layer 20. The recording layer is deposited using a spin coating technique. On the recording layer 20 is provided a reflecting layer 30 which is formed of silver. The thickness of the reflecting layer generally is between 60 to 80 nm. FIG. 2 is a structure similar to FIG. 1 but it has additional layer between the dye recording layer and the silver metal reflector of a metallic interlayer 25 consisting Pd, Au, Ni and Sn or a transparent dielectric interlayer consisting of Ge—C—H, Si—N and InSnSb—O and alloys. For a more detailed description of the use of interlayers, see commonly assigned U.S. patent application Ser. No. 08/971,969, (docket 76,892) filed Nov. 17, 1997 entitled "Recordable Optical Disks With Metallic Interlayer" and U.S. patent application Ser. No. 08/971,740, (docket 76,936) filed Nov. 17, 1997 entitled "Recordable Optical Disks With Dielectric Interlayer."

Thin films of silver reflector and other metals were deposited by sputter deposition using DC magnetron gun and metal targets in an argon atmosphere. Thin films of Ge—C—H were deposited by sputter depositing Ge target in Ar and $CH_4$ atmosphere and Si—N films were prepared by sputter depositing Si target in Ar and $N_2$ atmosphere. Similarly InSnSb—O were prepared by sputter depositing InSnSb target in an atmosphere with a mixtures of argon and oxygen. Then the UV-curable lacquer overcoat was spin coated on the reflecting layer. These disks were tested for reflectivity ($R_{top}$), window margin (WM), jitters and other relevant parameters using Kodak PCD 600 6X writer/reader at 2.4 m/sec. Here, $R_{top}$ is reflectivity measured by PCD-600 as the reflectivity of the unwritten land. $R_{top}$ is substantially lower than the true reflectivity because of birefringence, groove structure of the disk and the influence of the neighboring marks and tracks.

Several full structure disks were prepared using different combination of interlayers and the reflectors. Au is noble and provides a long term stability for the recording layer. Silver metal has higher reflectivity than the gold. The window margin which is a figure of merit for these disks shows a dramatic decrease in Window Margin for the disk with the silver reflector. The Window Margin (WM) for a disk with the gold reflector indicate almost no change. Thus CD-R disk using silver reflector does not provide adequate long term read stability of the written information. The reason for the degradation of the performance for the disk using silver reflector can be seen from the small (3T) and large (11T) mark jitter as function of aging time. The 3T mark jitter decreases while 11T mark jitter increases with the aging time. There also is a phenomenon of mark growth possibly due to the interfacial interaction between the silver metal and the dye recording layer. The improvement in the long term stability of the data was achieved by the use of interlayer. In this case the disk without and with interlayers have similar window margin and other performance parameters before the accelerated aging test.

It has been found, quite unexpectedly, that the performance and the thermal stability of the disk using silver reflector dramatically improved when the disks were written after they were subjected to a heat treatment. As will be shown below, that the discs made using the present invention exhibit improvement, among other parameters, in jitter and WM and $R_{top}$.

One of the important features of the invention is the heat treatment of recording elements. Heat treatment can be accomplished by any number of well known techniques. For example, a plurality of discs can be mounted on a spindle, and that spindle and discs can be placed in an air oven. The temperature of the air oven is preselected and the discs are heat treated for a predetermined period of time. Thereafter, the spindle and discs are removed from the oven and are cooled in air until they reach room temperature. Benefits are generally improved at more elevated temperatures and longer periods of time. For example, it has been found that, at temperature of 70° C. or greater for time periods of 6 hours or more, significant improvements are made. The temperature and the time of heat treating are limited by the plasterizing of polycarbonate substrates so that the geometry of the disc and the groove structure in the disc, are not significantly altered.

The long term stability of the recorded data was examined by subjecting these to accelerated aging tests which were carried using two conditions: 95° C. dry heat; and 80° C. and 85% RH wet conditions. The original mark were read back after the incubation test at periodic intervals.

The discs were tested using an automated tester including a Kodak PCD 600 writer/reader. The recording and read back were performed at the constant linear velocity of 2.4 m/s. The following parameters were determined: reflectivity ($R_{top}$), optimum recording power (ORP), written contrasts; and nonlinearity NL (maximum difference of peak shifts among all features) Wm and jitter. In the CD recording scheme there are 18 features—nine of them are made by laser exposures and are called marks and the rest nine are features created by not exposing to laser beam and are called lands. Their exposure times are expressed in multiples of detection window width (115.7 ns). The 3T, 4T, 5T . . . 11T marks are made by exposing to laser beam for 3 detection widths, 4 detection widths, 5 detection widths, and so on. The marks are correspondingly designated as 3M, 4M, 5M . . . 11M with 3M being the smallest and 11M being the largest of the marks. Similarly there are nine lands designed as –3L, 4L, 5L . . . 11L S3M, S4M, etc. are the jitters of the corresponding marks. S3L, S4L, etc. are the jitters of the corresponding lands between marks. The contrasts ($C_3$ and $C_{11}$) and jitters (S3M, S11M and S3L, S11L) presented in the examples are of the smallest and largest features.

Several full structure disks as shown in FIG. 1 were prepared in quick sequence. The thickness of the Ag reflector was about 80 nm and were overcoated with an UV-cured protective lacquer overcoat. Performance of a typical control disk is shown in column 2 of the Table 1.

TABLE 1

Comparison of the Disk Performance Before and After Heat Treatment

| Recording Parameter | Performance as deposited | Performance after heat treatment |
|---|---|---|
| ORP(mW) | 6.9 | 6.9 |
| Rtop(%) | 64.1 | 65.6 |
| NL(ns) | 43.8 | 38.2 |
| S3M(ns) | 8.9 | 7.6 |
| S3L(ns) | 11 | 9.5 |
| S11M(ns) | 8 | 6.4 |
| S11L(ns) | 10 | 8.4 |
| WM(%) | 35 | 43 |

The above control disk then was subjected to treatment consisting of heating to 85° C. in air oven for 16 hours followed by normal cooling in air. The disk performance was then determined by writing a new band adjacent to original band. The disk performance after the heat treatment is included in column 3 of the Table 1.

It is clear that the heat treated disk has much better performance. Thus because of the modification effected by the present invention, there occur significant improvements in $R_{top}$, contrasts, NL, jitters and Wm.

Figure 3:
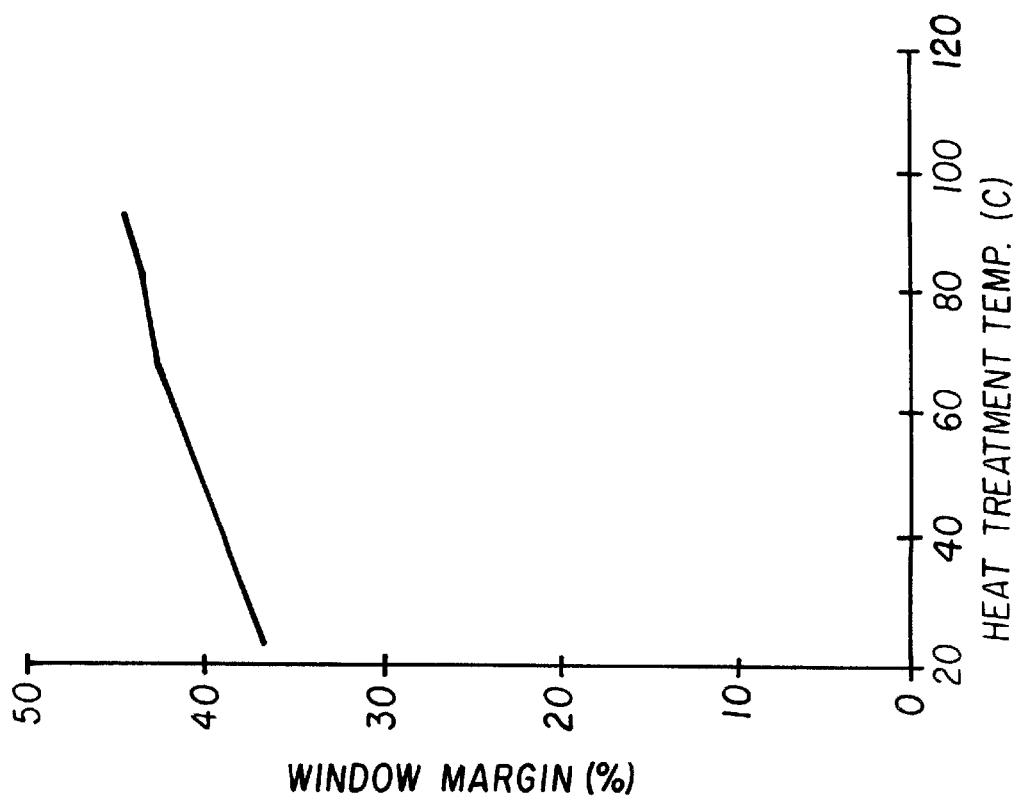
FIG. 3 show the improvement in the widow margin of the disk with Ag reflector as a function of heat treatment temperature. Disks were treated for sixteen hours in dry air at particular temperature.

The improvement in disk performance is a function of heating temperature and time. Longer time is required if the heat treatment is done at a low temperature, while shorter time is required if the heat treatment is done at high temperature. The temperature and the time of heat treating are limited by the plasterizing of polycarbonate substrates so that the geometry of the disc and the groove structure in the disc, are not significantly altered. Heat temperatures can be selected from 50° to 120° C. and the time of treatment can vary from 1 to 24 hours. FIG. 3 shows the improvement in the window margin of the disks as a function of heating temperature. These disks were subjected to heating at respective temperatures for 16 hours in dry air oven. It is evident that because of the heat treatment there occur significant improvements window margin. Similarly, improvement in $R_{top}$, contrasts, NL, and jitters were observed.

Figure 4:
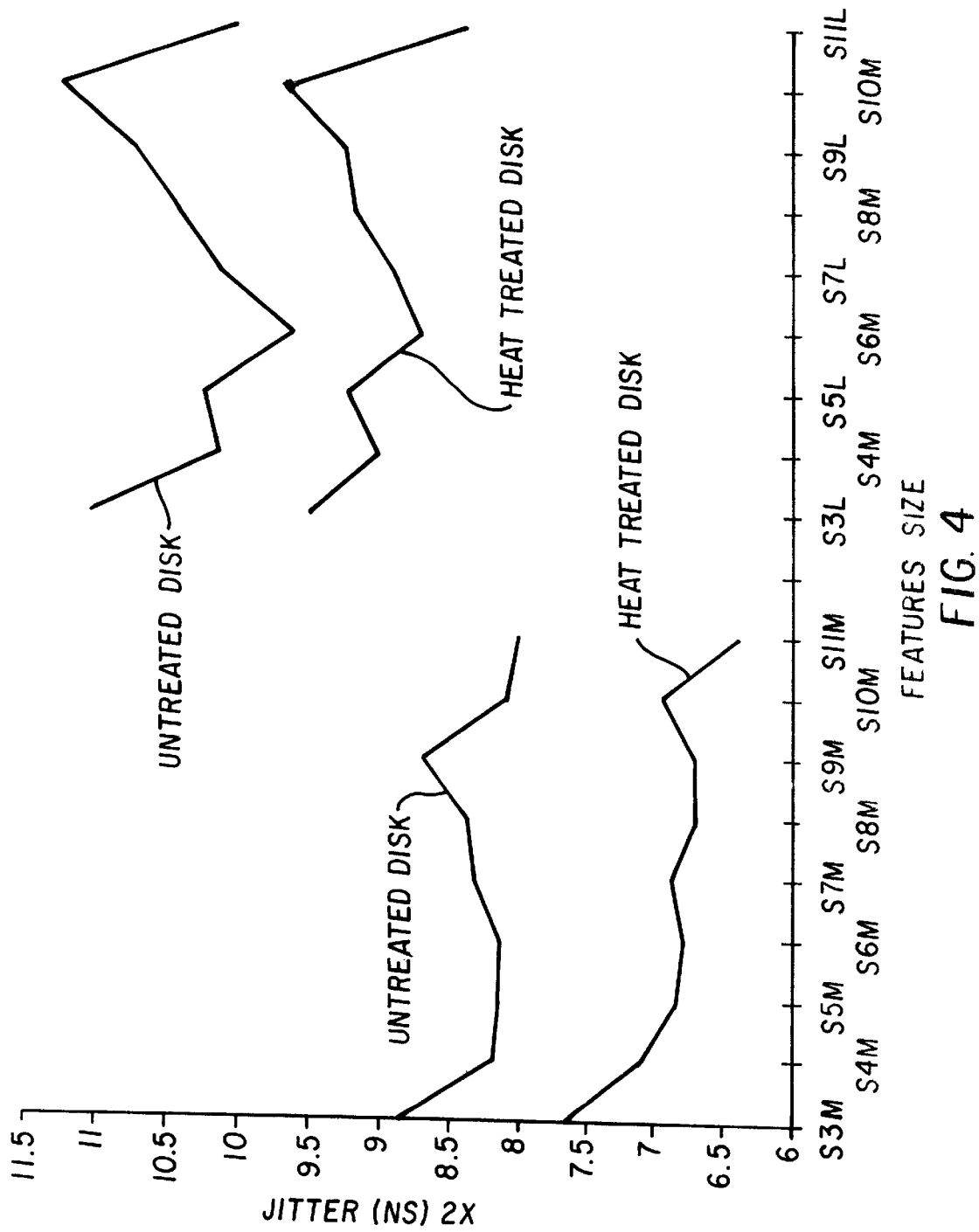
FIG. 4 shows comparison of jitters of the disk before and after heat treatment.

FIG. 4 shows comparison of jitter of a disk before and after heat treatment. The performance of the disk was measured just after the deposition. The jitters of mark and land are shown in FIG. 4. Then it was subjected to treatment of heating to 95° C. in air oven for 16 hours followed by normal cooling in air. The performance of this disks was then determined by writing/reading another band adjacent to original band. The jitters of this heat treated disk are included in FIG. 4. It is clear that because of the modification effected by the present invention there occurs significant decrease in the jitters of mark and land.

Figure 5:
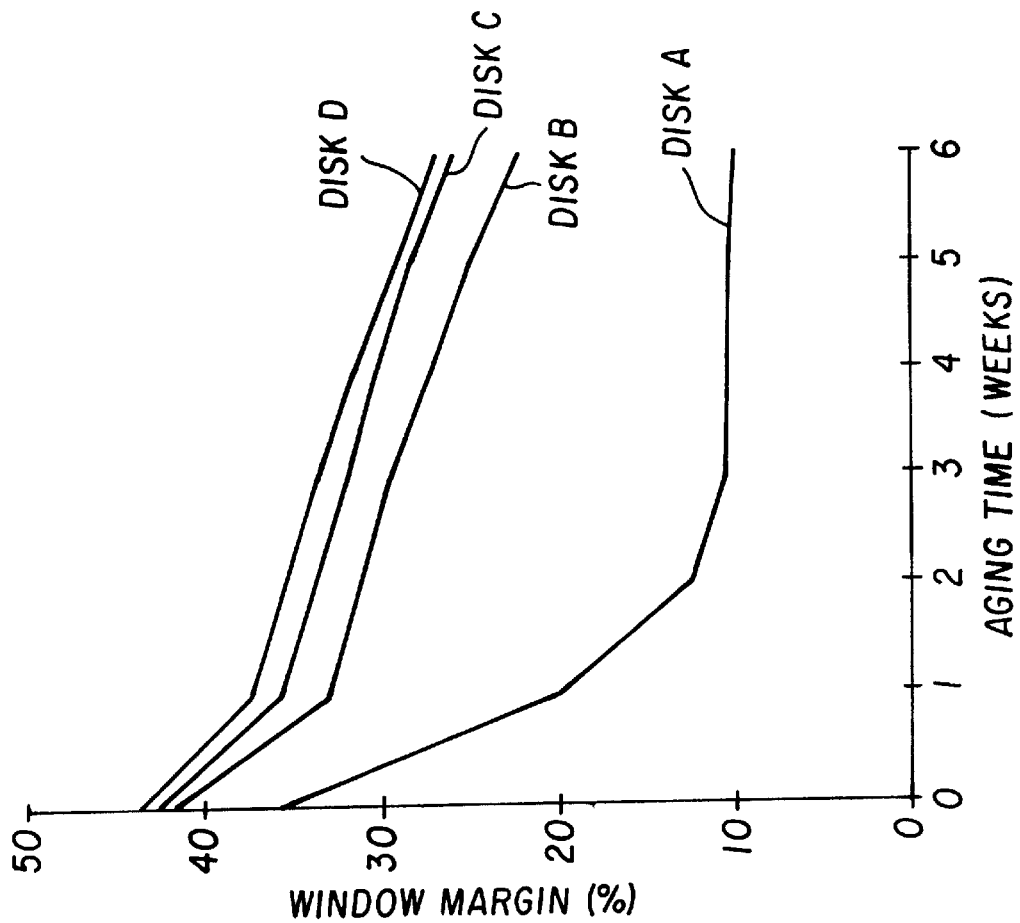
FIG. 5 shows WM as a function of Aging time for four disks without heat treatment and after heat treatment. Heat treatment was carried out 70° C., 85° C. and 95° C. for 16 hours in air oven. While accelerated aging test was carried at 80° C./85% RH conditions.

The another important advantage of the invention is that the disks prepared by following the present invention exhibited higher stability than that without the heat treatment. FIG. 5 shows the window margin as a function of accelerated aging time for four disks, A, B, C, and D using Ag reflector. Disk A is a control disk which did not undergo heat treatment. Disks B, C and D were subjected to a treatment consisting of heating at 70°, 85° and 95° C., respectively, in air ovens for 16 hours followed by normal cooling in air. These disks then were subjected to accelerated aging test at 80° C./85% RH and their performance was measured after periodic intervals. The data for all disks are shown in FIG. 5. It shows that disks B, C, and D have much improved stability as compared to disk A. Thus recording elements made in accordance with the present invention have significantly superior data stability than the control disk.

Figure 6:
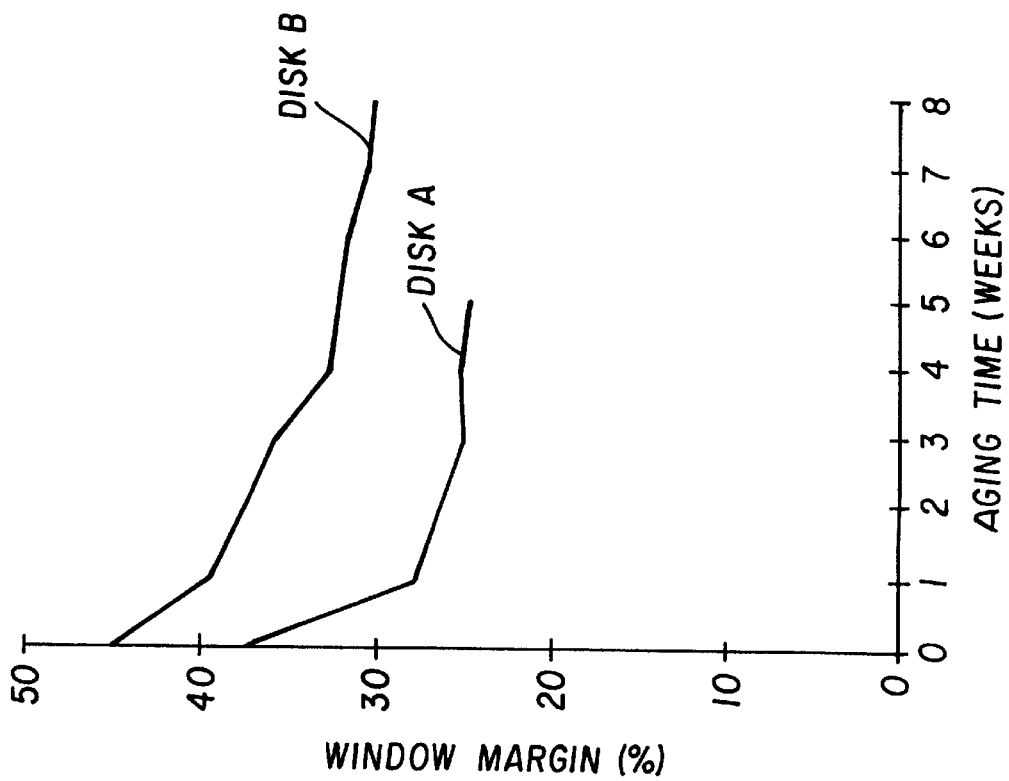
FIG. 6 shows WM as a function of Aging time for two disks without and with heatment of 16 hours at 85° C. The disks have with 0.5 nm Pd interlayer and Ag reflector.

Stability of the CD-R disk using Ag reflector was improved using interlayers of metals and dielectrics between the reflector and the dye recording layer as described in the commonly assigned U.S. patent application Ser. No. 08/971,969, (docket 76,892) filed Nov. 17, 1997 entitled "Recordable Optical Disks With Metallic Interlayer" and U.S. patent application Ser. No. 08/971,740, (docket 76,936) filed Nov. 17, 1997 entitled "Recordable Optical Disks With Dielectric Interlayer." Before the accelerated aging test, performance (in particularly WM, jitters) of the disks using interlayers are similar to the disks without interlayer. It was found that the performance and stability of the disks with Ag reflector and interlayers can further be improved by following the present invention. FIG. 6 shows the window margin as a function of accelerated aging time for two disks A and B using Ag reflector and 0.5 nm Pd interlayer. Disk A is control disk which did not go any treatment. While Disk B is similar in structure as of Disk A but was subjected to a treatment consisting of heating at 85° C., in air ovens for 24 hours followed by normal cooling in air. Both disks A and B then were subjected to accelerating aging tests at 80° C./85% RH and performance was measured after periodic intervals. As seen from FIG. 6, at the zero aging time, it is clear that because of the modification effected by the present invention there occur significant improvements in Wm. Similarly the WM of the heat treated disk B is significantly higher than that of control disk A, for an accelerated aging time of six weeks, indicating that disks B has much improved stability as compared to disk A. Thus, recording elements made in accordance with the present invention have significantly superior stability than the control disk.

Figure 7:
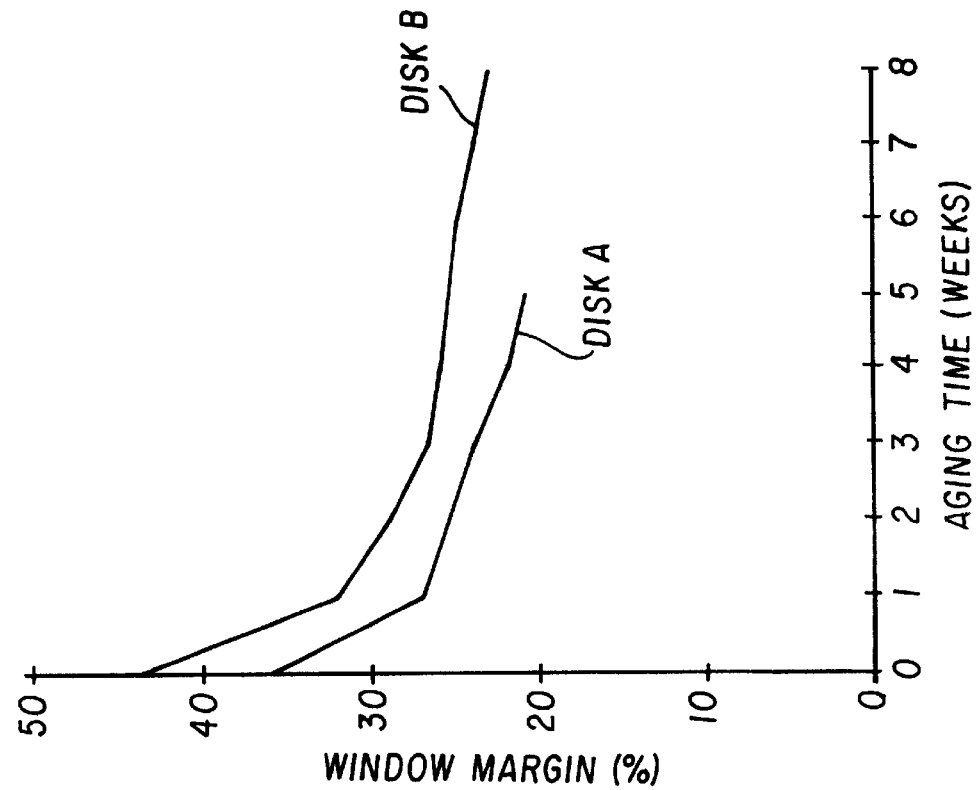
FIG. 7 shows WM as a function of Aging time for two disks without and with heatment of 16 hours at 85° C. The disks have with 3 nm Sn interlayer and Ag reflector.

Similarly FIG. 7 shows the WM as a function of accelerated aging time for two disks using 3 nm Sn interlayer. Disk A is a control disk and disk B was subjected to a heat treatment for 16 hours at 85° C. After measuring their performance, both disks A and B then were subjected to accelerating aging tests at 80° C./85% RH and performance was measured after periodic intervals. Again disk B shows much higher recording stability than the disk A.

Thus the recording elements made in accordance with the present invention have significantly superior performance with respect to WM, $R_{top}$, NL, and jitters, and much improved recording stability.

To further improve the extended stability of the disks prepared following this invention, stable alloys of silver metal reflector such as Ag—Pd, Ag—Cu, and Ag—Ni can be used instead of pure silver. The alloying additions of 2–5% Pd, Cu, or Ni into Ag metal were found to increase the environmental stability of the silver reflector. Moreover, stability of the disk structure can further be improved by protecting silver metal or silver alloys from corrosion/oxidation using a thin protective layer of metal, such as Pd, Cr, Ni etc. or a thin layer of dielectric, such as Ge—C—H, Si—N and InSnSb—O on the reflector layer before overcoating the disk with an UV-curable lacquer.

The invention has been described in detail with particular reference to certain preferred embodiments thereof, but it will be understood that variations and modifications can be effected within the spirit and scope of the invention.

| PARTS LIST | |
|---|---|
| 10 | substrate |
| 20 | dye recording layer |
| 25 | interlayer |
| 30 | reflecting layer |
| 40 | UV-curable lacquer protective overcoat |

What is claimed is:

1. A method of making an optical disk comprising the steps of:

a) providing a transparent substrate;

b) forming a recording layer over the substrate and a reflective layer formed of Ag over the recording layer; and c) heating treating the optical disk at a temperature range of about 50°–120° C. for a time between 1–24 hours to cause a substantial improvement in performance.

2. The method of claim 1 further providing an interlayer on the recording layer and the reflecting layer on the interlayer.

3. The method of claim 1 wherein the interlayer is a thin metallic interlayer formed on the recording layer at the interface between the reflective layer and the recording layer wherein the thin metal interlayer includes materials selected from the group consisting of Pd, Ni, Sn, Au, In, Te, Si, Ge, and alloys thereof.

4. The method of claim 1 wherein the thin metal interlayer includes materials selected from the group consisting of Pd, Ni, and Au.

5. The method of claim 1 wherein when the thin metal interlayer is Pd, Ni, Sn, In, Te, Si, Ge, or alloys thereof in a range between 0.2 nm to 3 nm and when it is Au, it is a range of 0.2 nm to 30 nm.

6. The method of claim 1 wherein the interlayer is a thin metallic interlayer which includes materials selected from the group includes Au formed on the recording layer at the interface between the reflective layer and the recording layer and selected to have a thickness in a range between 0.2 nm to 30 nm.

7. The method of claim 1 wherein the recording layer includes a photosensitive material selected so as to form a mark when illuminated by laser light at a particular wavelength.

8. The method of claim 1 wherein the photosensitive material is a phthalocyanine dye.

9. The method of claim 1 wherein the photosensitive material is a cyanine dye.

10. The method of claim 1 wherein the photosensitive material is a formazan metal complex dye.

11. The method of claim 1 further including an overcoat UV curable lacquer protective layer.

12. The method of claim 1 further including a dielectric overcoat layer on the reflective layer to protect the reflective layer and an overcoat UV curable lacquer layer on the dielectric overcoat layer.

13. The method of claim 1 wherein the substrate includes a polycarbonate material.

* * * * *